March 25, 1958     H. D. HOIG ET AL     2,827,658
PATTY ROLLER
Filed Dec. 13, 1955
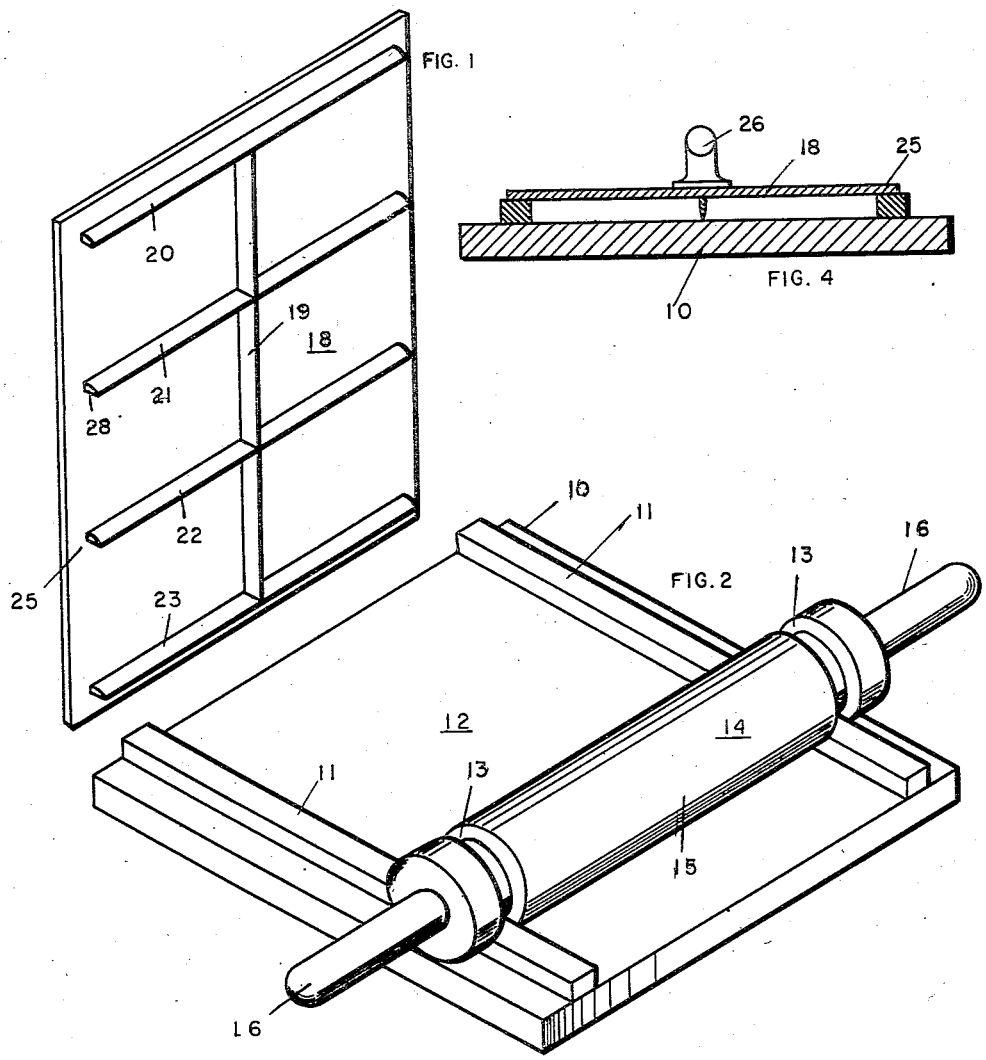
INVENTORS
Henry D. Hoig
Edmund Zaft
BY
Charles L. Lovercheck
Attorney

2,827,658
Patented Mar. 25, 1958

2,827,658
PATTY ROLLER

Henry D. Hoig, McKean, and Edmund Taft, Erie, Pa.

Application December 13, 1955, Serial No. 552,962

1 Claim. (Cl. 17—32)

This invention relates to meat handling devices and more particularly to devices for forming patties from ground meat.

It is desirable in the operation of restaurants, diners, and food dispensing concessions to have hamburg patties prepared in advance of the time that they are to be served. In order to obtain the most economical distribution of the meat, it is desirable to have each patty be as nearly the same size and weight as the other patties as possible and, also, to obtain the maximum number of patties from each pound of ground meat. The disclosed apparatus could be used for cutting biscuits, cookies, etc. in commercial or domestic establishments.

It is, accordingly, an object of this invention to provide a device for preparing meat which is simple in construction, economical in manufacture, and simple and efficient to use.

Another object of the invention is to provide a device for preparing meat which provides a number of patties which are uniform in cross sectional size and wherein the thickness of the patties in any batch are uniform but the thickness of various batches can be varied by varying the depth of groove in a rolling device.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

Fig. 1 is a perspective view of a cutting device for use with a hamburg cutting machine;

Fig. 2 shows the board for rolling out the hamburg and the rolling pin disposed thereon;

Fig. 3 is an end view of the meat cutting device; and

Fig. 4 is a transverse cross sectional view of the device with the cutting board in place.

Now with more specific reference to the drawing, the device shown in Figs. 1 to 4 may be constructed of hardwood, plastic, or other material. A meat board 10 has track ways 11 disposed in spaced parallel relation thereon and extending upwardly from the board 10 enclosing a meat receiving space 12 therebetween. The ways 11 are adapted to be received in grooves 13 formed at each end of a rolling pin 14 and an intermediate meat engaging portion 15 disposed between the grooves 13 and handles 16 extending outwardly from either end. The rolling pin 14 is moved backward and forward along the ways 11 to flatten the meat out and cause it to form a uniform layer between the track ways 11. The depth of the grooves 13 determines the distance between the rolling pin 14 and the space 12 and by making the groove 13 deeper, the hamburg patties will be thinner.

A cutting board 18 has a central longitudinally extending knife portion 19 with spaced lateral knife members 20, 21, 22, and 23 which are affixed to the cutting board 18 by gluing or they may be molded integral with the cutting board 18. The top of the cutting member 18 extends beyond the ends of the knife members 20, 21, 22, and 23 at 25 and the marginal edges 25 are adapted to rest on the ways 11 with the knife members 20, 21, 22, and 23 disposed therebetween. A handle 26 may be affixed to the cutting member 18 by which it may be handled in lifting it to cut the patties.

When it is desired to form patties from a quantity of meat, the quantity of meat is placed on the space 12 between the ways 11 and the rolling pin 14 is run backward and forward thereover. Each time the rolling pin 14 is run over the meat, it gets thinner until the bottoms of the grooves 13 rest on top of the ways 11. When the meat has been smoothed down to uniform thickness, the operator will place the ends 28 of the knife members 20, 21, 22, and 23 between the inner edges of the ways 11 and press downwardly on the handle 26. This will force the knife members 20, 21, 22, and 23 to cut grooves through the meat and thereby separate the meat into patties having dimensions equal to the thickness of the spacing between the periphery of the rolling pin 14 and the spaces between the knives 20, 21, 22, and 23 and the knife portion 19.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

In a meat mold board for use with a roller having peripheral grooves at spaced points thereon comprising a board having a flat meat supporting surface, and spaced parallel ways attached to said surface and extending upwardly therefrom, said ways adapted to be received in said grooves in said roller, said grooves being of substantially lesser depth than the height of said ways, said ways being adapted to receive a cutting board therebetween for cutting meat on said board into predetermined shapes.

References Cited in the file of this patent

UNITED STATES PATENTS

| 33,033 | Exton | Aug. 13, 1861 |
| 534,460 | Wolff et al. | Feb. 19, 1895 |
| 1,629,295 | Oertel | May 17, 1927 |
| 2,181,666 | Molin | Nov. 28, 1939 |
| 2,645,852 | Weinberg | July 21, 1953 |

FOREIGN PATENTS

| 25,867 | Switzerland | Apr. 25, 1903 |